United States Patent
Corrales Lopez

(10) Patent No.: US 9,380,644 B2
(45) Date of Patent: Jun. 28, 2016

(54) ACCESS POINTS TO PROVIDE EVENT NOTIFICATIONS

(71) Applicant: HEWLETT-PACKARD DEVELOPMENT COMPANY, L.P., Houston, TX (US)

(72) Inventor: David Corrales Lopez, San Jose (CR)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 36 days.

(21) Appl. No.: 13/723,480

(22) Filed: Dec. 21, 2012

(65) Prior Publication Data

US 2014/0177611 A1    Jun. 26, 2014

(51) Int. Cl.
*H04W 88/08* (2009.01)
*H04W 48/08* (2009.01)

(52) U.S. Cl.
CPC .............. *H04W 88/08* (2013.01); *H04W 48/08* (2013.01)

(58) Field of Classification Search
CPC .............................. H04W 88/08; H04W 48/08
USPC ................................................. 370/338; 726/4
See application file for complete search history.

(56) References Cited

U.S. PATENT DOCUMENTS

| | | | |
|---|---|---|---|
| 7,339,914 B2 * | 3/2008 | Bhagwat et al. | 370/338 |
| 7,676,218 B2 | 3/2010 | Ballai | |
| 8,176,328 B2 | 5/2012 | Chen et al. | |
| 8,856,876 B2 * | 10/2014 | Park et al. | 726/3 |
| 2005/0054326 A1 | 3/2005 | Rogers | |
| 2006/0165073 A1 * | 7/2006 | Gopinath | H04W 48/04 370/389 |
| 2010/0299725 A1 * | 11/2010 | Yamada | 726/4 |

FOREIGN PATENT DOCUMENTS

WO    WO-2011121294    10/2011

OTHER PUBLICATIONS

Mateti, P., "Hacking Techniques in Wireless Networks," 2005. <http://www.cs.wright.edu/~pmateti/InternetSecurity/Lectures/WirelessHacks/Mateti-WirelessHacks.htm>.

* cited by examiner

*Primary Examiner* — Mark Rinehart
*Assistant Examiner* — Gbemileke Onamuti
(74) *Attorney, Agent, or Firm* — Hewlett Packard Enterprise Patent Department

(57) ABSTRACT

An access point is to provide a wireless beacon packet via a wireless communication. The wireless beacon packet is to include an event notification in response to an indication of a need for the event notification.

13 Claims, 5 Drawing Sheets

ACCESS POINTS TO PROVIDE EVENT NOTIFICATIONS

BACKGROUND

A wireless network can provide network access for client devices that connect to the wireless network. However, prior to connection, the wireless network does not provide notification information. Thus, a client device must first connect to the wireless network, before being able to determine whether the network is under attack or has any other problems and/or issues.

BRIEF DESCRIPTION OF THE DRAWINGS/FIGURES

DETAILED DESCRIPTION

Example systems provided herein can utilize a wireless beacon packet of a wireless network (e.g., a wireless local area network (WLAN)), to provide a notification of an event. An access point of a network may broadcast the wireless beacon packet, and the notification may be provided in a service set identification (SSID) string, a vendor-defined field, and/or other portion of the wireless beacon packet. Accordingly, client devices (and users of those devices) may be provided with the notification, without even needing to join the wireless network. Thus, the client device may receive notification that e.g., something out of the ordinary is happening with the wireless network, and decide and/or be prevented from ever joining the network. Notifications may be provided automatically, without a need for human intervention, ensuring rapid response to a potential network threat. Example systems may provide integration between the network infrastructure and the client devices, by enabling client devices to configure themselves to deliver a safer user experience. Other examples may be used for situations not directly related to events that impact the network and/or wireless clients, such as uses including advertising.

Figure 1:
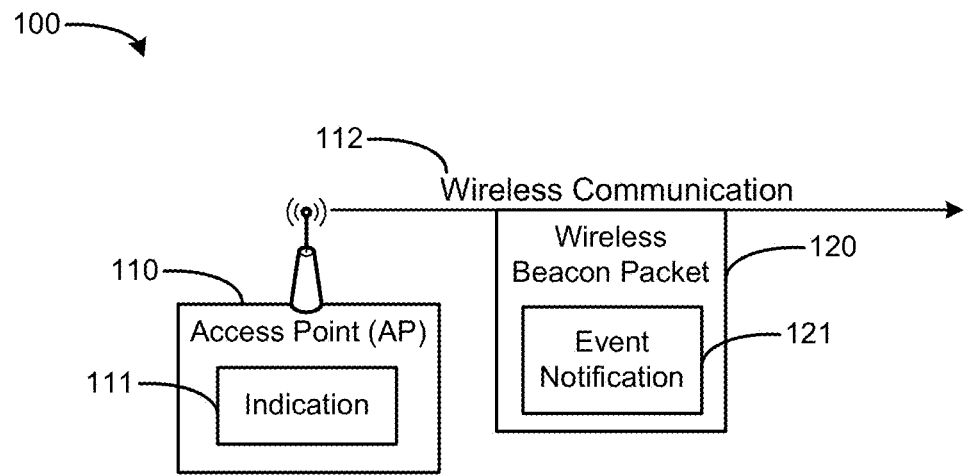
FIG. 1 is a block diagram of a system including a wireless communication according to an example.

FIG. 1 is a block diagram of a system 100 including a wireless communication 112 according to an example. Access point 110 may provide an event notification 121 via the wireless communication 112, in response to indication 111. The event notification 121 may be provided via the wireless communication 112 based on a wireless beacon packet 120.

The wireless communication 112 may be based on any wireless local area network (WLAN) products, such as those that are based on the Institute of Electrical and Electronics Engineers' (IEEE) 802.11 standards, including Wi-Fi™. The wireless communication 112 is to provide a wireless beacon packet 120 or equivalent information that may be broadcast and received by client devices without a need to join the network.

The wireless beacon packet 120 is to provide information to devices that potentially may connect to the network. The wireless communication 112 may specify standardized features that the wireless beacon packet 120 is to include, such as identification information and capabilities of the wireless communication 112 and/or access point 110. The wireless beacon packet 120 may describe frequency ranges, available channels, communication speeds, and other features regarding the wireless communication 112 and/or access point 110.

The system 100 may use event notification 121 (e.g., a notification contained in an SSID string or other feature of the wireless beacon packet 120) to provide information. The event notification 121 may be provided in a form that typical client devices are already prepared to receive. The event notification 121 may utilize a format that is viewable by a user of a client device attempting to join a wireless network corresponding to the wireless communication 112. For example, the event notification 121 may be an SSID for the access point 110, which may be used to announce, advertise, and/or provide notification of events, such as malicious access points (APs) or other network issues/intrusions. Accordingly, it is possible to provide a readable notification, such as a text string, that is viewable before connecting to the network. Furthermore, the notification is viewable even for those who may not intend to connect to the network. For example, a coffee shop may provide, on a wireless beacon packet 120, a notification for a free incentive. Client devices in a bookstore nearby may receive the notification to serve as a form of advertisement and draw users to the coffee shop. The notification may relate to the network infrastructure, such as warning when the network infrastructure will be going down for maintenance, or that there are problems with network access, or any other event that may be identified as in need of notification.

An event may be an occurrence, such as a network intrusion, the timing of a sales promotion, detection of a malicious access point, and so on. The event may include a temporal aspect, such as an occurrence that is going to take place or that has already taken place, and may have a time-limit or duration. For example, the event may occur after the wireless network has been set up, and/or the event may change/finish/resolve after passage of time (e.g., before a network administrator has an opportunity to configure the wireless access point, including situations where the event manifests and resolves without the network administrator even noticing). Thus, the example systems described herein may provide event notifications to address events automatically, without a need for human intervention.

The indication 111 may be generated by the access point 110, or may be received by the access point 110 from another network device and/or a network infrastructure. The indication 111 is to indicate to the access point 110 that an event notification 121 is needed. For example, there may be a time when an advertisement is to be sent out, such that the indication is time-based. Or, a network intrusion or other problem may be detected, causing the access point 110 to receive the indication 111 from the network infrastructure (e.g., the indication 111 may be sent from an intrusion detection system, controller, or other network device).

A network infrastructure (e.g., an environment in which the access point 110 operates, including network devices such as access points, routers, switches, controllers, intrusion detection systems, and so on) may provide the indication 111 for a need for an event notification 121, based on many types of events. The network infrastructure may include wireless and wired network connections. An access point (such as access point 110) may be plugged into the wireless (and/or wired)

network, with its radios turned on and set to open access. Such an access point may be referred to as a rogue AP, allowing bypassing of security by client devices that connect to that open rogue AP. The network infrastructure may detect the rogue AP and identify a need for an event notification 121 with information regarding the rogue AP. Various other attacks may be detected (and corresponding event notifications 121 may be provided), such as honey pots, man-in-the-middle attacks, and others. For example, an interloper may attempt to take down an AP 110, or attempt to bring down the service quality (e.g., quality of service (QoS)) for APs by sending special groups of packets causing the APs to consume resources. Other attacks may include rogue AP disassociation flood attacks, ad-hoc networks involving authorized clients being miss-associated from an authorized network to a rogue AP, and many other possible attacks including newly developed attacks (with corresponding new techniques for detecting such attacks).

The network infrastructure may detect these and other types of attacks, for example, based on network devices such as an intrusion detection system to automatically detect events. Radios of the APs 110 may scan for issues and pass the results of the scan to each other and/or the network infrastructure (e.g., to an intrusion detection system or other controller of the network infrastructure), such that the system 100 may react and provide the event notification 121.

The event notification 121 may be visible to a user of a client device, e.g., a client device displaying a list of SSIDs for available wireless networks to join. The event notification 121 can warn a user prior to joining a network that the network has been attacked/compromised, or otherwise cause the user to doubt whether to join the network. Thus, the user may be provided with an opportunity to act in response to the event notification 121 before joining the network, such as waiting to see if the event notification 121 changes, asking a network administrator, or otherwise attempting to get more information as to a status of the network.

Network infrastructure may be provided based on at least one access point 110. Controllers or other devices/modules may be included in the AP 110, and/or provided as separate devices/modules as part of the network infrastructure. Thus, example systems provided herein may be applicable to any network infrastructure. For example, network infrastructure may include products that support wireless access, detection of network issues, and/or advertising. The network infrastructure may include a wireless framework, an intrusion detection system, or any type of logic to detect an AP 110. Network infrastructure may encompass a system to support the capability to allow a client device to associate with the network infrastructure and be provided any type of service, such as Internet access, wireless communication 112, and other services.

Figure 2:
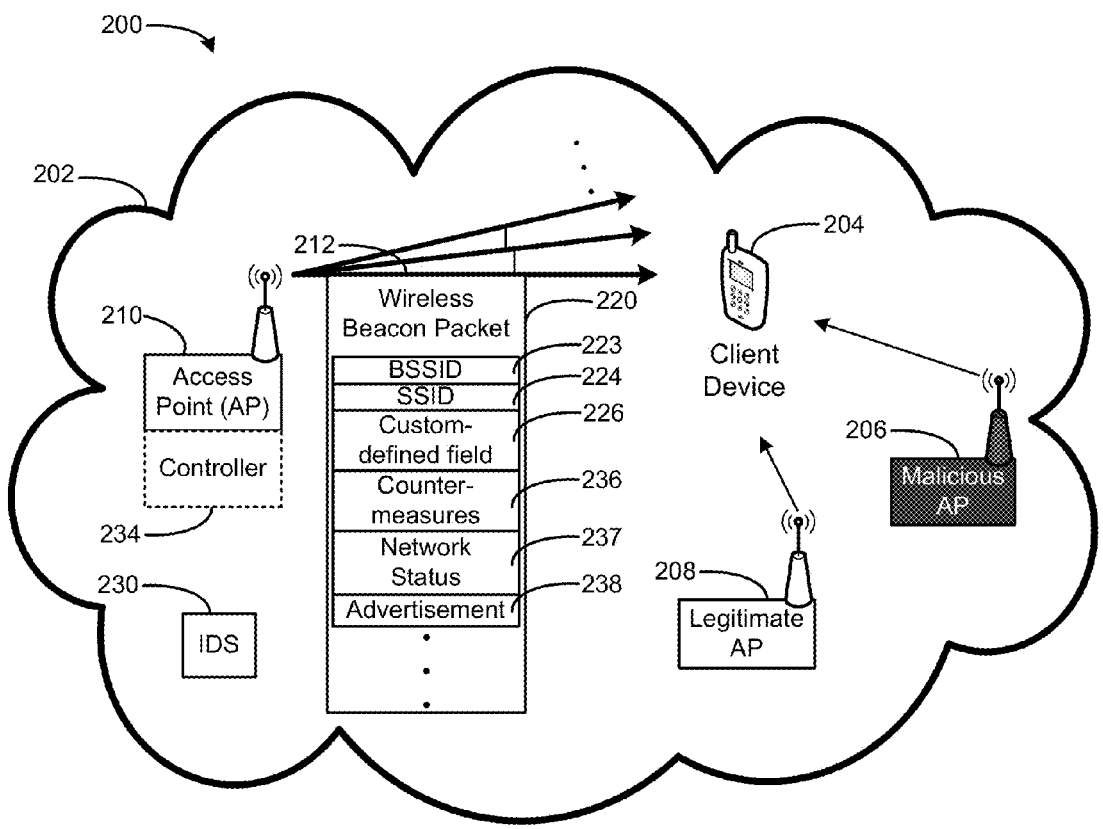
FIG. 2 is a block diagram of a system including a wireless communication according to an example.

FIG. 2 is a block diagram of a system 200 including a wireless communication 212 according to an example. Network infrastructure 202 may enable access point 210 to provide an event notification based on wireless beacon packet 220. The wireless beacon packet 220 may include SSID 224, custom-defined field 226, countermeasures 236, network status 237, advertisement 238, and other features not specifically illustrated, to notify a client device 204. Network infrastructure 202 may interact with other legitimate access points 208, and may detect a malicious access point 206 using an intrusion detection system (IDS) 230. The network infrastructure 202 may be enabled based on a controller 234. For convenience, two APs 208, 210, and one client device 204, one controller 234, and one malicious AP 206 are shown, though one or many of each of these objects may be involved.

Network infrastructure 202 may provide many services, such as Hypertext Transfer Protocol (HTTP) service, Domain Name System (DNS) service, a radius server 802.1x authentication with an active directory to manage objects within the network, local accounts, password systems, file servers, at least one controller 234, at least one AP 210, switches, and so on. Network infrastructure 202 may include wired and wireless network access.

The controller 234 may provide functionality to discover the APs 210, 208 and provide centralized configuration and synchronization of parameters for the APs. Thus, the controller 234 may provide various aspects of the functionality of the network infrastructure 202. As shown, the controller 234 may be incorporated into an AP 210. The AP 210 also may incorporate the IDS 230. Thus, detection of a need for an event, such as intrusion detection and/or other network/advertisement issues (e.g., logic and other network infrastructure functionality), may be provided by the AP 210. Thus, references herein to network infrastructure 202 may encompass any single or combination among access points 210, controllers 234, and IDSs 230.

The IDS 230 system may be external to controller 234 and/or access point 210, though these devices may be integrated together in various combinations. Controller 234 may gather data from the APs 210, 208, and send the gathered data to the IDS 230. Thus, a set of one or more devices/nodes may work in conjunction to provide the network infrastructure 202.

The IDS 230 may be a segment of logic residing on a device, to determine whether or not a given AP 206, 208, 210 is malicious. The IDS 230 is referred to herein as an intrusion detection system, though IDS 230 is not limited only to an intrusion detection system. For example, IDS 230 may be implemented as a special-function firewall, security platform, or other logic/device to protect the network infrastructure 202 and determine whether or not an AP 206, 208, 210 exposed to the network infrastructure 202 is malicious.

The access point 210 is to provide wireless communications 212. A wireless communication 212 may be associated with a wireless beacon packet 220. In the illustrated example of FIG. 2, an event notification may be provided as SSID 224 and/or custom-defined field 226. The wireless beacon packet 220 may be associated with a single SSID 224. Thus, AP 210 may provide multiple wireless beacon packets 220 in order to provide multiple event notifications (e.g., a warning SSID 224 provided in a first wireless beacon packet 220 of the AP 210, and a legitimate SSID provided in a second wireless beacon packet 220). Thus, there may be two (or multiple, such as 16, 32, etc.) SSIDs being broadcast, the multiple SSIDs 224 being viewable separately by a client device 204.

The wireless beacon packet 220 may include other features, such as a BSSID 223. In contrast to the SSID, which may be a text string, the BSSID is a hardware address used for a client to associate, from a technical hardware driver level perspective. The BSSID for a first wireless communication 212 may be incremented by 1 to obtain the BSSID for a second wireless communication 212. Thus, the network infrastructure 202 may support many wireless communications 212 based on the nature of the BSSID being able to uniquely identify and enable multiple wireless communications 212. Some example products may support 16 simultaneous wireless communications 212, other products may support 32, and a greater or fewer number of wireless communications 212 may be supported as a technical or implementation detail of a particular example.

An AP 210 may add a wireless communication 212, with its associated wireless beacon packet 220 and event notification (e.g., SSID 224), to provide notification of an event. If the available wireless communications 212 (e.g., all 32 of its SSIDs 224) for a given AP 210 are already in use, one of the existing SSIDs 224 may be replaced with the desired event notification to be broadcast. There is not a hard limit of how many wireless communications 212 may be supported by an AP 210, although shared medium wireless spectrum may impose a physical limitation preventing an infinite amount.

The network infrastructure 202 may identify that SSIDs 224 for an AP 210 are in use, identify an SSID 224 in use to be replaced, and replace the identified SSID 224 with a notification SSID. The technique for identifying and replacing may be configurable. For example, in a first configuration, the network infrastructure 202 may identify that there aren't any available SSIDs 224, but still refuse to sacrifice/replace one of those SSIDs 224 that are in use. A second configuration may indicate that the network infrastructure 202 is to sacrifice SSIDs 224 as needed for new event notifications.

The creation and/or replacement of SSIDs 224 may be automatic. In an example, the network infrastructure 202 may identify which SSIDs 224 across multiple APs 208, 210 would provide sufficient and/or optimal coverage of an area, even if replacing at least one of those SSIDs 224 among the multiple APs. Thus, examples enable replacement with little or no impact on client connectivity across the network infrastructure 202. For example, a client device 204 associated with a first AP 210 via a first SSID 224 that becomes replaced, may automatically re-associate with a second AP 208 based on a second SSID 224 within range of the client device 204. SSIDs 224 among multiple wireless communications 212 may be prioritized. The network infrastructure 202 may be associated with a customizable SSID priority list. Thus, the network infrastructure 202 may refer to the SSID priority list to determine a priority order for disabling/replacing SSIDs that are already in use, in order to allow creation of a new SSID 224 (e.g., a notification SSID). The SSID priority list may be customized/populated by an administrator and/or automatically as SSIDs are dynamically created/released.

The network infrastructure 202 may consider coverage provided by the SSIDS 224 throughout the various APs 208, 210 across the network infrastructure 202, in determining which SSIDS in use that are to be disabled and/or replaced. For example, if a single 210 AP is transmitting an SSID 224, the network infrastructure 202 may not take down and/or replace that SSID 224, because it may be the only way that client devices 204 have to connect to the network infrastructure 202. In contrast, there may be, e.g., four APs 208, 210 in a vicinity of the client device 204, and all provide a good signal for the particular SSID 224 being considered for replacement/take-down. That SSID 224 may be replaced/taken-down, and client devices 204 may automatically roam to other APs 208, 210 so that their connectivity will not be impacted. Thus, example systems may provide event notifications while ensuring the least interference possible to client devices 204. The network infrastructure 202 also may emphasize an event notification, e.g., by decreasing broadcast power for those wireless communications 212 associated with SSIDs 224 that are not compromised or providing an event notification. Thus, the compromised and/or notification SSIDs become more visible to client devices 204 based on the increased relative broadcast power. The broadcast power of the compromised and/or notification SSIDs may be increased for more prominence to client devices 204.

The network infrastructure 202 may detect a malicious AP 206 within a vicinity of legitimate APs 208, 210. For example, IDS 230 may determine that the network infrastructure 202 is under attack due to malicious AP 206 in the vicinity of various identified APs 208, 210. The network infrastructure 202 may determine the vicinity of malicious AP 206 based on a function of signals from the malicious AP 206 that are detected and recognized by the other APs 208, 210. The network infrastructure 202 may determine legitimate APs 208 that are nearest the malicious AP 206. For example, those APs 208 that detect a relatively strong signal from the malicious AP 206 may be deemed nearest to the malicious AP 206. The network infrastructure 202, e.g., by way of IDS 230, may keep a list of all APs 208, 210 that are detecting the malicious AP 206. That list may be sorted according to an amount of signal power received from signals from the malicious AP 206.

IDS 230 may receive information from the APs 208, 210 that are gathering that information. The IDS 230 engine may determine if there is a threat that is to be handled. An AP 208, 210 may identify information that is being broadcast, including which SSIDs 224 are being broadcast by other APs 206, 208, 210. The IDS 230 system may take that information and determine whether an AP 206 is being malicious not towards the network infrastructure 202. If so, the network infrastructure 202 may determine that an event notification is needed, and provide a notification SSID or other action. For example, the wireless communication 212 may include countermeasures proactively deployed against the malicious AP 206 in an attempt to take down the malicious AP 206. In an example, system 200 may cause APs 208, 210 to flood the malicious AP 206 with special types of packets to prevent the malicious AP 206 from working properly.

The following scenario describes an example regarding handling of a malicious AP 206 by system 200. The network infrastructure 202, e.g., a corporate network, detects the malicious AP 206 within the vicinity of the legitimate APs 208, 210. Detection may be handled through an IDS 230 system. The system 200 will then proceed to identify the legitimate APs 208, 210 closest to the malicious AP 206. The network infrastructure 202 may direct the APs 208, 210 to raise their broadcast power to the maximum possible to increase the likelihood of client devices 204 connecting to them instead of the malicious AP 206. The network infrastructure 202 may direct the APs 208, 210 to broadcast a new event notification (SSID 224) containing a concise message to alert client devices of an event (e.g., the threat of the malicious AP 206). For example, SSID 224 may state "<compromised SSID> has been compromised." The event notification SSID 224 will be highly visible to client devices 204 (and their users) attempting to connect to the network infrastructure 202.

It may be desirable to allow connections to a given SSID 224, even if it is the <compromised SSID>. For instance, AP 210 may broadcast SSID 224 "cafeteria" that is not compromised. Client devices 204 may join "cafeteria" without issue. Subsequently, an interloper in the vicinity of network infrastructure 202 activates malicious AP 206, whose SSID is also called "cafeteria." The intention is to serve as a honeypot to capture traffic of the client devices 204. The SSID 224 of AP 210 is changed, for instance, to say "cafeteria is compromised," client devices 204 will still see the "cafeteria" malicious SSID from the malicious AP 206. If SSID 224 of AP 210 is changed, and client devices 204 join the existing "cafeteria," they would be joining the malicious AP 206. To ensure that a legitimate SSID "cafeteria" remains available, the network infrastructure 202 may cause legitimate APs 208, 210 to raise the broadcast power for any applicable SSIDs 224 named "cafeteria." Raising the power may cause the legitimate SSID 224 "cafeteria" to be displayed most prominently on the client device 204 when showing a list of available wireless networks (typically shown in order according to signal strength). Thus, client devices 204 would specifically be more likely to join the legitimate "cafeteria" SSID 224, even if users of the client device 204 missed the event notification/warning that cafeteria was compromised.

Continuing with the example, when attempting to broadcast the notification SSID, it may be possible that the legitimate APs 208, 210 are already using all available (e.g., 16) SSIDs. However, an AP 208, 210 may coordinate with other legitimate APs 208, 210 (e.g., under the direction of the network infrastructure 202) to determine which valid SSID already in use should be sacrificed for use as the new notification SSID 224. For example, nearby AP 210 may continue serving client devices 204 using the old SSID (that was sacrificed on legitimate AP 208 for use as a new event notification). Thus, the client devices 204 may avoid service interruption by roaming to AP 210 using the old SSID.

The wireless beacon packet 220 may be provided with a custom-defined field 226, such as a vendor-specific tag. The custom-defined field 226 may enable the client devices 204 to react accordingly. For example, a client device 204 may be capable of recognizing the custom-defined field 226 and taking action to protect itself. Such features may provide aggregate value when using such exemplary client devices 204 connected to exemplary compatible network infrastructures 202.

The custom-defined field 226 may be interpreted by logic at the client device 204. For example, client device 204 may have an Intel® wireless driver that may be customized to read the custom-defined field 226 on the wireless beacon packet 220. The client device 204 may include logic, such as software, to take action in response to the custom-defined field 226 (e.g., provide a warning notification that obscures the screen of the client device 204). The response by the client device 204 may involve adding more flexibility in the types of reactions the client device 204 may take, as well as providing even more information about the event notification (e.g., providing a more detailed summary of the event). Actions the client device 204 may take include the client device logic actively disabling listings of the malicious AP 206 when requesting on the client device 204 a list of available wireless networks. Alternatively, the client device 204 may prevent joining any malicious AP 206, as communicated in the wireless beacon packet 212. Thus, example systems 200 may provide added value, in the sense that end-to-end protection is ensured by exemplary logic/functionality at the network infrastructure 202 and the client device 204. A first level of protection is provided by the event notification (e.g., notification SSID 224) being included as the SSID. A second level of protection is provided by proactively controlling what a client can or cannot do, using the custom-defined field 226 to instruct the client device 204 to react (e.g., block connections to a malicious AP 206).

The custom-defined field 226 also may prevent the client device 204 from being tricked by a malicious AP 206 using a specially crafted SSID string, such as in a denial-of-service attack (launching a malicious AP 206 with a malicious SSID to prevent clients from joining the legitimate SSID 208). Example systems enable the client device 204 to perform packet interchange, to verify that as source is as it claims to be.

Figure 3A:
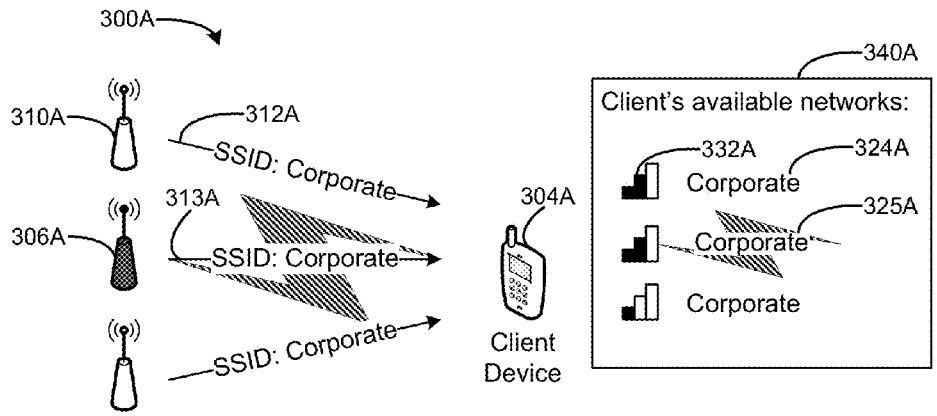
FIG. 3A is a block diagram of a system including a wireless communication according to an example.

FIG. 3A is a block diagram of a system 300A including a wireless communication 312A according to an example. Access points (APs) 310A provide wireless communication 312A, made available for client device 304A. Wireless communication 312A may be associated with a broadcast power 332A and SSID 324A. A malicious access point 306A may provide malicious wireless communication 313A associated with malicious SSID 325A.

FIG. 3A shows an initial state, as the malicious AP 306A comes online so that system 300A can react. Initially, AP 310A is providing wireless communication 312A associated with SSID 324A at a broadcast power 332A. System 300A may react immediately to detect a malicious AP 306A providing malicious wireless communication 313A associated with malicious SSID 325A at the broadcast power 332A. For example, system 300A may direct AP 310A to continuously scan for anomalous activity, actively providing event notifications (and other responses such as advertising, custom-defined fields, and/or countermeasures) while the malicious AP 306A is present. The SSID 324A and the malicious SSID 325A appear at the top of the list of client's available networks 340A as displayed on the client device 304A. The system 300A may remain actively responding until the threat has been neutralized or otherwise resolved, at which point the system 300A may return to an initial state (e.g., broadcasting wireless communication 312A associated with a single SSID 324A).

Figure 3B:
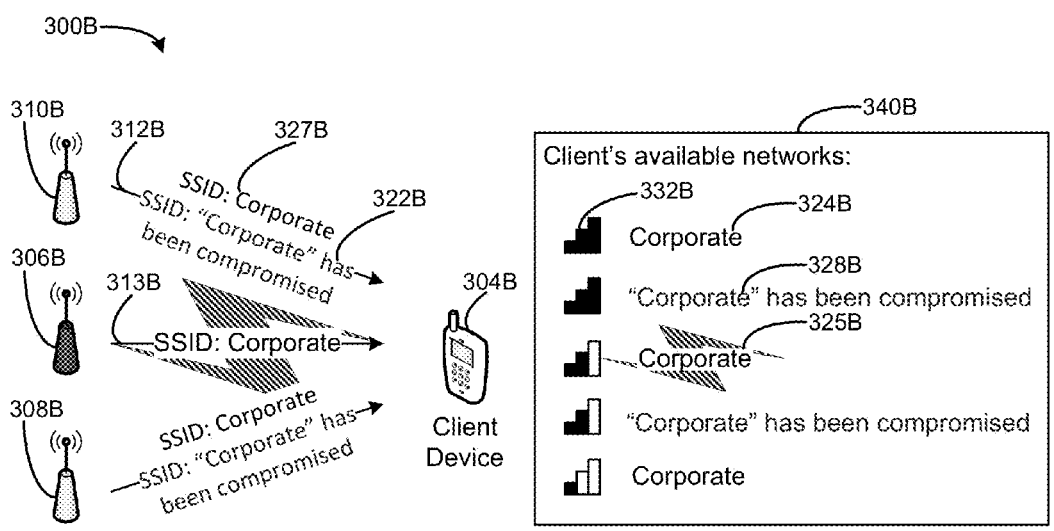
FIG. 3B is a block diagram of a system including a wireless communication according to an example.

FIG. 3B is a block diagram of a system 300B including a wireless communication 312B according to an example. Access point (AP) 310B is to provide wireless communication 312B for client device 304B. Wireless communication 312B may be associated with a broadcast power 332B and SSID 324B. Malicious access point 306B may provide malicious wireless communication 313B associated with malicious SSID 325B. AP 310B may provide legitimate SSID 327B and event notification 322B. The event notification 322B may be provided as notification SSID 328B.

As shown in FIG. 3B, event notifications 322B are provided and broadcast power 332B is changed consistent with the features described herein. In the example of FIG. 3B, the client device 304B (e.g., a laptop, mobile phone, PDA, or other networked device) may sort the list of received SSIDs that have been broadcast within range of the client device 304B, based on sorting from the most powerful signal to the least powerful signal. A system 300B may detect that malicious AP 306B is transmitting at perhaps 100% broadcast power 332B. Typical radio management policies for system 300B may be to conserve power during normal operation and maintain legitimate APs 308B, 310B (including those in the vicinity of the malicious AP 306B) transmitting at 65% broadcast power. Thus, the malicious SSID 325B might appear first on the list of available SSIDs on the client device 304B. In such a condition, the client device 304B may be more likely to be associated with an SSID having a stronger signal with the expectation of better performance, services, and/or transfer rates. Thus, the system 300B may react to this event by throttling up the wireless radius of legitimate access points 308B, 310B. For example, system 300B may cause a legitimate AP 308B, 310B to transmit at 100% broadcast power 332B. Accordingly, the client's available networks may appear as shown, wherein legitimate SSID 324 (which may share the same name as malicious SSID 325B by virtue of being targeted for compromising) is shown at highest priority. By raising the broadcast power 332B for legitimate APs 308B, 310B, those APs become just as and/or more attractive to client devices 304B as malicious AP 306B broadcasting at full strength and/or at relatively close proximity to the client device 304B compared to legitimate APs 308B, 310B. Thus, there will be less likelihood of client devices joining malicious APs 306B.

The system 300B may apply a similar approach to adjusting broadcast power 332B when it comes to the notification SSID 328B carried by the wireless communication 312B. Thus, both the legitimate SSID 324B and notification SSID 328B may appear with side-by-side visibility on the list of client's available networks. FIG. 3B also shows that the example AP 310B now provides two wireless communications 312B, associated with legitimate SSID 327B and event notification 322B. Thus, AP 310B demonstrates the use of an additional SSID for notification, alongside the original SSID used for typical connectivity to the AP 310B. In alternate examples, the SSID may be replaced (e.g., when all SSIDs are in use, and/or when other APs 308B may receive connections to client devices 304B that roam to AP 308B when a used SSID is replaced to serve as an event notification 322B).

Another feature of system 300B is that is it possible to decrease broadcast power 332B for a legitimate SSID 327B on various APs 308B, 310B, effectively raising the prominence of SSID 324B and notification SSID 328B. For example, system 300B may identify SSIDs for an AP that is not relatively proximate to the malicious AP 306B, and/or identify SSIDs that do not share a name with compromised SSIDs being broadcast by the malicious AP 306B. Thus, by decreasing broadcast power of such SSIDs, it is possible for system 300B to cause the SSID 324B and notification SSID 328B to appear higher on the list of client's available networks, due to their relatively greater broadcast power 332B compared to those SSIDs whose broadcast power 332B was decreased. Adjusting power (by increasing and/or decreasing) similarly may be used to change the relative order of SSIDs that otherwise would appear to the client device 304B to have the same broadcast power and would therefore be sorted in alphabetical order. Thus, if a compromised SSID has a name beginning with the letter Z, the system 300B my cause APs 308B, 310B to adjust power to elevate the sorted position of that compromised SSID (and its corresponding notification SSID) to raise the relative position of event notification 322B and legitimate SSID 327B.

In an example, system 300B may enable client devices 304B to connect using notification SSID 322B. In an alternate example, system 300B may prevent connections on the notification SSID 322B. For example, the system 300B may determine whether a malicious AP 306B is broadcasting a malicious version of notification SSID 322B. Although the SSID 324B is available for client devices 304B to connect to network services, system 300B may deploy similar approaches as described above, while applying them to the malicious version of notification SSID 322B.

In an example, system 300B may provide modified network services on the legitimate SSID 327B and/or the notification SSID 328B. For example, when a client device 304B associates to the notification SSID 328B, requests for network service may be redirected to a special webpage providing the modified network services. For example, the special webpage may provide additional information to supplement the event notification 322B. Such additional information may state that, e.g., "the legitimate SSID 327B has been compromised, please contact network support." Thus, when client devices 304B associate, additional information may be provided by the system 300B, raising additional awareness. Further information may be included, and additional controls may be provided such as providing the additional information while preventing normal network connectivity. Alternatively, the informational webpage may be shown upon associating with network services, after which the client device 304B is provided with normal network services (and/or a persistent or recurring reminder). The system 300B may determine whether to use such modified network services on the legitimate SSIDs 327B and/or the notification SSIDs 328B.

The feature of whether to provide modified network services, and/or whether to display an informational webpage, may be a configurable option. For example, system 300B may provide a configuration option to selectively utilize and/or suppress event notification 322B, notification SSID 328B, modified network services, and/or informational webpage. For example, system 300B may identify that a client device 304B corresponds to a Chief Executive Officer (CEO), and selectively suppress mention of compromised networks for that client device 304B.

The system 300B may consider other factors in determining whether to utilize and/or suppress various features. An example factor may include what types of services the client device 304B would typically access, e.g., based on typical device profiles, usage histories of devices, and other factors. In an example, a menu option may be provided to select a service type. For client devices 304B seeking free internet access (e.g., in a coffee shop, library, or other casual environment), an example system 300B may provide a greater degree of network notification/limitation. In another example, for an enterprise solution where trusted clients are joining for a daily work routine, system 300B may suppress some of the network notifications/limitations/redirections, customizable by choices offered to the client device 304B.

Figure 4:
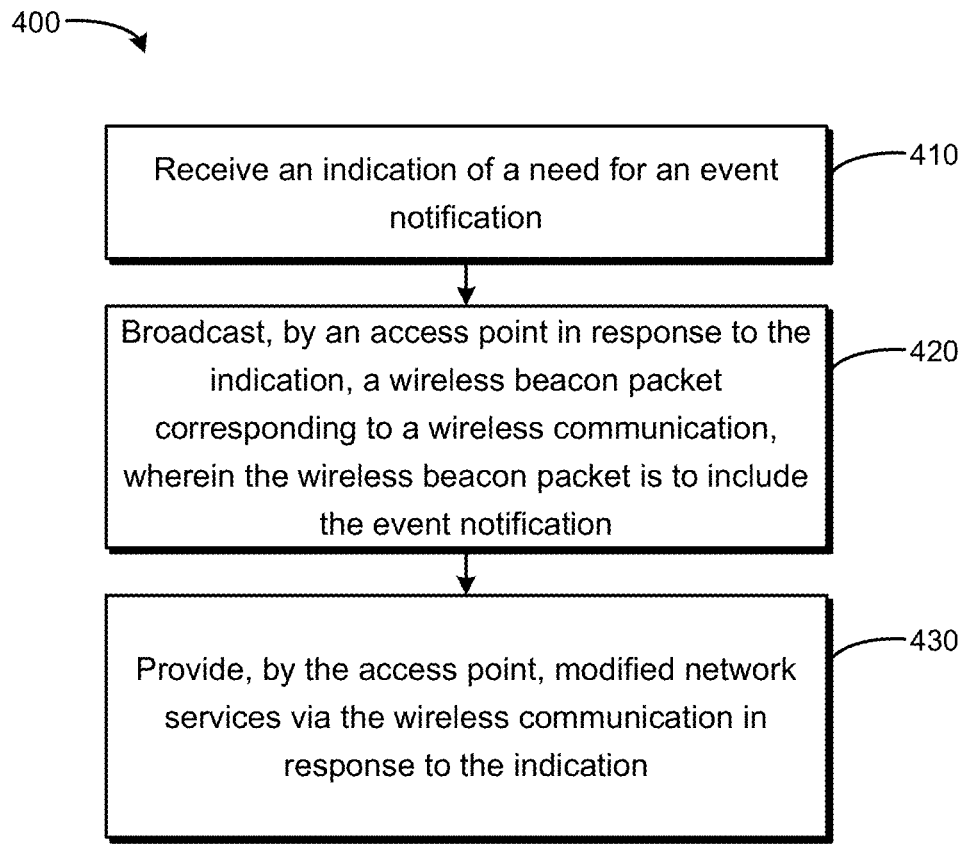
FIG. 4 is a flow chart based on broadcasting a wireless communication according to an example.
Figure 5:
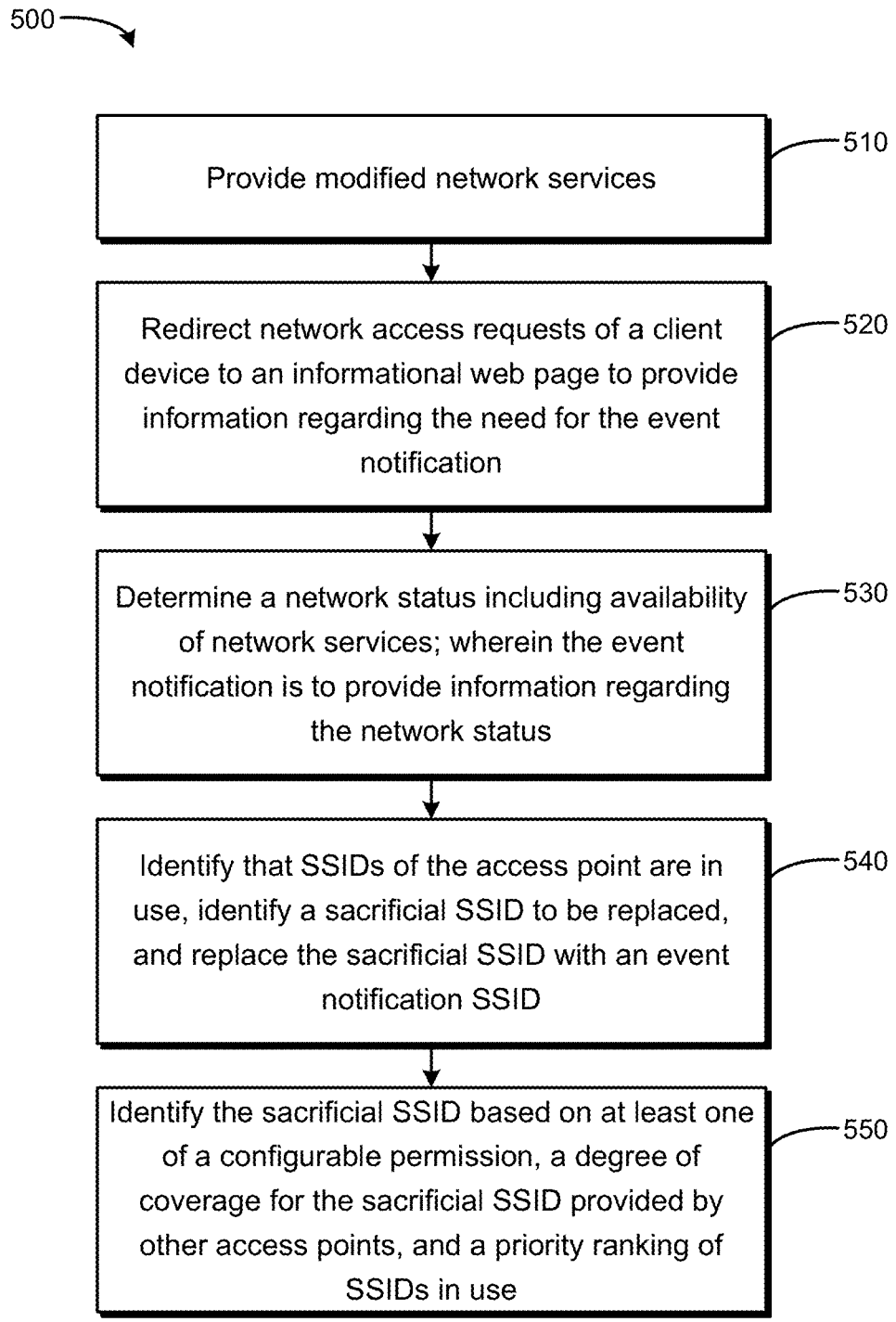
FIG. 5 is a flow chart based on providing modified network services according to an example.

Referring to FIGS. 4 and 5, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 4 is a flow chart 400 based on broadcasting a wireless communication according to an example. In block 410, a network infrastructure is to identify a need for an event notification. For example, the passage of time may indicate a new and/or changed advertisement event notification, there may be detection of a malicious AP or other network intrusion, and/or there may be a network status update and/or change that has, is, or will happen to the network infrastructure. In block 420, an access point is to broadcast a wireless beacon packet corresponding to a wireless communication. The wireless beacon packet is to include the event notification. For example, the wireless beacon packet may include a notification SSID and/or a custom-defined field. The event notification may instruct a client device to take action in response to the even notification. In block 430, the access point is to provide modified network services on the wireless communication in response to identifying the need for the event notification. For example, the modified network services may include selectively (e.g., on a per-client device basis) limiting access to network resources, redirecting requests for network services to an alternate/informational webpage, preventing network access entirely, and/or other features.

FIG. 5 is a flow chart 500 based on providing modified network services according to an example. In block 510, modified network services are provided, e.g., according to the features as set forth above regarding earlier examples of providing modified network services. In block 520, network access requests of a client device are redirected to an informational webpage to provide information regarding the need for the event notification. For example, the informational webpage may provide supplemental information to the client device. The informational webpage may be generated dynamically, and may be updated to track the changes in any determined need for an event notification. The informational webpage may provide selectable options with which a client device may interact. In block 530, a network status including availability of network services is determined. The event notification is to provide information regarding the network status. For example, a scheduled time for a planned network outage may be approaching, so an event notification may be periodically provided and/or updated as the network outage approaches. Thus, potential users of network services may become aware of events that may affect the network resources, before ever connecting to the network resources. In block 540, SSIDs of the access point are identified as being in use, a sacrificial SSID to be replaced is identified, and the sacrificial SSID is replaced with an event notification SSID. For example, the access point may be using all of its available SSIDs, or it may be saturating the wireless channels with enough SSIDs such that creating a new SSID would degrade quality. Accordingly, an SSID is made available by sacrificing one of the SSIDs in use. In block 550, the sacrificial SSID is identified based on at least one of a configurable permission, a degree of coverage for the sacrificial SSID provided by other access points, and a priority ranking of SSIDs in use. Thus, the system may be carefully tailored as to how SSIDs in use are treated, including the initial decision as to whether any SSIDs in use will be sacrificed.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., a computing device) can include and/or receive a tangible non-transitory computer-readable medium storing a set of computer-readable instructions (e.g., software). As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. An apparatus comprising:
   an access point to:
   provide a wireless beacon packet via a wireless communication;
   receive an indication f a need for an event notification from an intrusion detection system (IDS) external from the access point;
   modify the wireless beacon packet to include an event notification in response to the indication of the need for the event notification, wherein the wireless beacon packet is customized for interpretation at a client device using a custom-defined field, wherein to modify the wireless beacon packet includes providing the event notification in the custom-defined field, and wherein the event notification includes information regarding protecting the client device from a malicious device; and
   adjust, in response to the indication of the need for the event notification, a broadcast power for broadcasting the wireless beacon packet,
   wherein the event notification is provided in a format that is displayed on the client device and the client device has not connected to a wireless network of the access point.

2. The apparatus of claim 1, wherein the access point is to provide the event notification based on a service set identification (SSID) string of the wireless beacon packet.

3. The apparatus of claim 2, wherein the access point is to newly provide the event notification SSID using an additional available SSID slot of the access point.

4. The apparatus of claim 1, wherein the information is to cause the client device to perform at least one of: providing a warning notification from the client device, modifying a designated service set identification (SSID) from the client device's list of available SSIDs, and preventing the client device from connecting to the designated SSID.

5. The apparatus of claim 1, wherein to adjust the broadcast power for broadcasting the wireless beacon packet includes at least one of:
   broadcasting, at an increased power, the wireless beacon packet including the event notification;
   broadcasting, at the increased power level, legitimate beacon packets based on detection of a malicious access point broadcasting similarly identified malicious wireless beacon packets; and
   broadcasting, at a reduced power level, legitimate wireless beacon packets that are dissimilar to the malicious wireless beacon packets.

6. The apparatus of claim 1, wherein the access point is to receive an indication of proximate legitimate access points that are located relatively near a malicious access point compared to other legitimate access points, and adjust a broadcast power for broadcasting wireless beacon packets based on the indicated proximity.

7. The apparatus of claim 1, wherein the access point is to receive an indication of the presence of a malicious access point, and deploy proactive countermeasures against the malicious access point.

8. A method, comprising:
   receiving an indication of a need for an event notification from an intrusion detection system external from an access point;
   broadcasting, by the access point, a wireless beacon packet corresponding to a wireless communication in response to the indication, wherein the wireless beacon packet is modified to include the event notification in response to the indication in a format that is displayed on a client device that has not connected to a wireless network of the access point, wherein the wireless beacon packet is customized for interpretation at the client device using a custom-defined field including the event notification and provides information regarding protecting the client device from a malicious device;
   adjusting a broadcast power for broadcasting the wireless beacon packet in response to the indication; and
   providing, by the access point, modified network services via the wireless communication in response to the indication.

9. The method of claim 8, wherein the modified network services include redirecting network access requests of a client device to an informational webpage to provide information regarding the need for the event notification.

10. The method of claim 8, further comprising determining a network status including availability of network services; wherein the event notification is to provide information regarding the network status.

11. The method of claim 8, further comprising identifying service set identification (SSIDs) of the access point are in use; identifying a sacrificial SSID to be replaced, and replacing the sacrificial SSID with an event notification SSID.

12. The method of claim 11, further comprising identifying the sacrificial SSID based on at least one of a configurable permission, a degree of coverage for the sacrificial SSID provided by other access points; and a priority ranking of SSIDs in use.

13. A non-transitory machine-readable storage medium encoded with instructions executable by a computing system that, when executed, cause the computing system to:
- receive an indication of a need for an event notification from an intrusion detection system external from an access point;
- broadcast, in response to the indication, a wireless beacon packet via a wireless communication from the access point, wherein the wireless beacon packet is customized for interpretation at a client device using a custom-defined field including the event notification and is to provide information regarding protecting the client device from a malicious device, and
- adjust a broadcast power for broadcasting the wireless beacon packet in response to the indication,
- wherein the event notification is provided in a format that is displayed on a Rent device that has not connected to a wireless network of the access point.

* * * * *